United States Patent [19]

Perry, II

[11] Patent Number: 4,530,032
[45] Date of Patent: Jul. 16, 1985

[54] CIRCUIT BOX

[76] Inventor: John M. Perry, II, 2123 Coronado SE., East Grand Rapids, Mich. 49506

[21] Appl. No.: 427,119

[22] Filed: Sep. 29, 1982

[51] Int. Cl.³ .............................................. H02B 1/04
[52] U.S. Cl. .................................. 361/340; 361/360; 361/378; 361/430; 361/428
[58] Field of Search ................... 174/59; 361/340, 334, 361/356, 358, 360, 361, 363, 378, 390, 391, 430, 428, 431

[56] References Cited

U.S. PATENT DOCUMENTS

| 742,563 | 10/1903 | Beehler | 292/86 |
|---|---|---|---|
| 1,211,752 | 1/1917 | Pieper | 361/331 |
| 1,227,590 | 5/1917 | Deindoerfer, Jr. | 292/87 |
| 1,550,031 | 8/1925 | Kovar et al. | 200/50 A |
| 1,620,814 | 3/1927 | Getchell | 337/10 |
| 1,848,837 | 8/1932 | Powers | 361/340 |
| 2,145,154 | 1/1939 | Corbett | 361/431 |
| 2,185,562 | 1/1940 | Nielsen | 369/391 |
| 3,338,465 | 8/1967 | Bard | 220/66 |
| 3,858,755 | 1/1975 | Tellen | 220/284 |
| 4,135,638 | 1/1979 | Wandl | 220/85 P |
| 4,209,820 | 6/1980 | Rundel et al. | 200/307 |
| 4,305,610 | 12/1981 | Piteo, Jr. et al. | 200/50 AA |

Primary Examiner—A. D. Pellinen
Assistant Examiner—Gregory D. Thompson
Attorney, Agent, or Firm—Price, Heneveld, Huizenga & Cooper

[57] ABSTRACT

A circuit box having two mounting plates pivotally connected so as to mount a fuse block and electrical control device in a stacked relationship but which allows operable connection of the fuse block and electronic control device in both a closed position in which only the second mounting plate is accessible and in an open position in which the other mounting plate is accessible. The pivotal mounting plate is connected to and spaced from a barrier plate to define a wire conduit therebetween. A stop prevents the pivotal mounting plate from pivoting past a predetermined open position.

9 Claims, 6 Drawing Figures

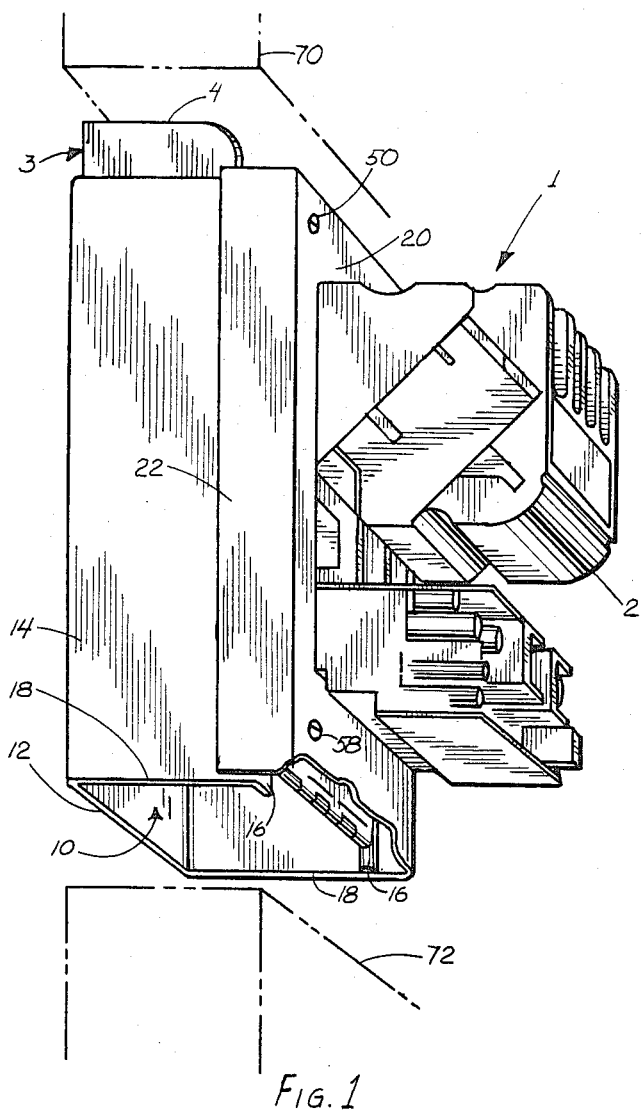
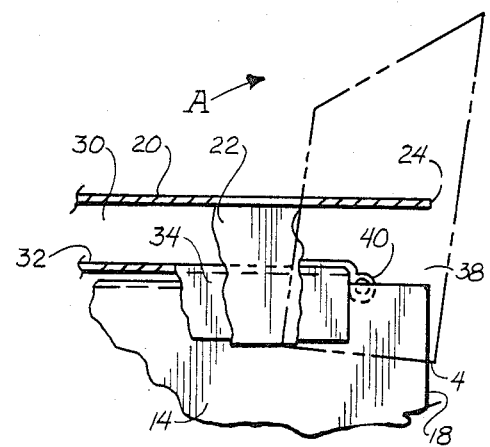
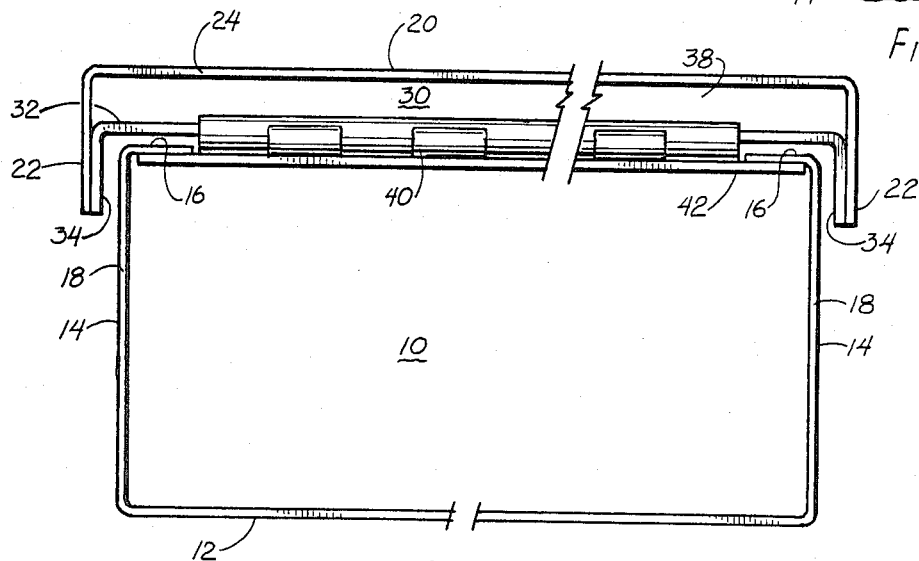

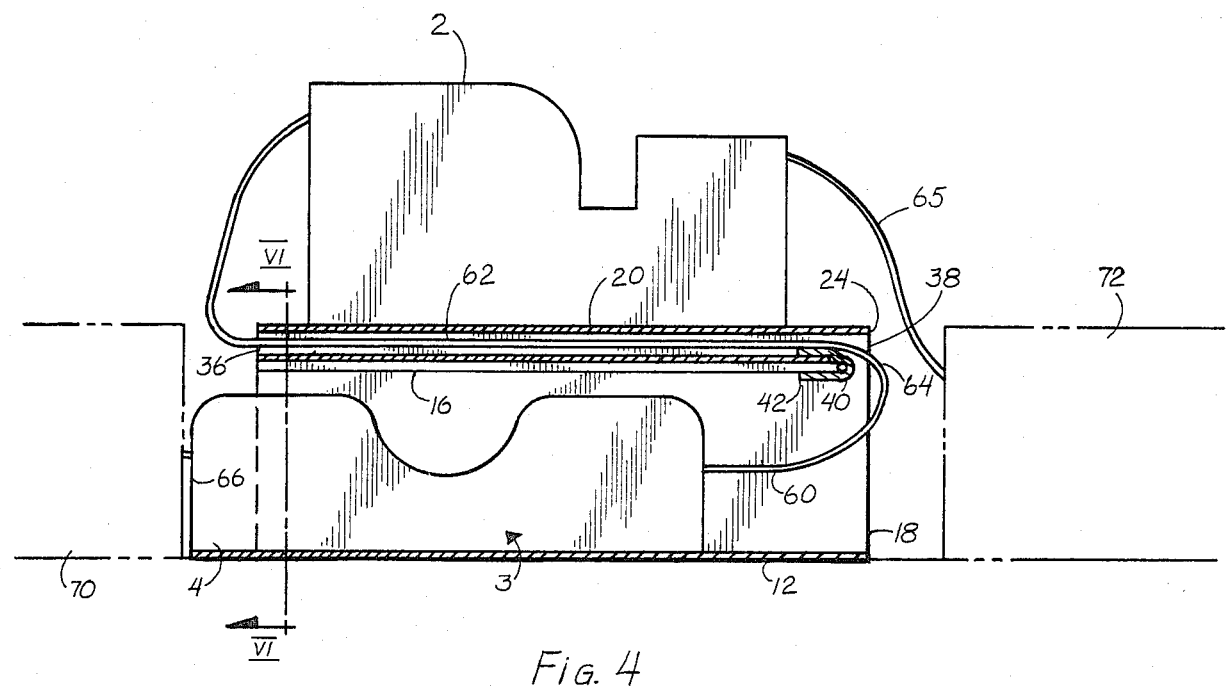

CIRCUIT BOX

BACKGROUND OF THE INVENTION

In many industrial applications, a large number of electrical control devices and fuses are required, and it is desirable that the fuses and control devices be located in a single area for efficiency of operation, maintenance, and that they be protected by an enclosure from the industrial environment. Due to the large physical size of some of these industrial fuses and control devices, a substantial amount of panel area is required to support large banks of these devices. These panel areas are protected by specially designed enclosures which require production floor space. Both the enclosure and floor space are expensive. If the space required for controllers, and fuses could be reduced, enclosure size and thus, floor space could be reduced, improving plant efficiency and making the industrial equipment and complex more competative in world markets. Thus, it is desirable to reduce the panel area necessary for mounting such devices while keeping the two relatively close together. It is also desirable that one of the two devices does not obstruct the other such that the electrical control device, for example, need not be physically disconnected in order to check or replace its associated fuse.

SUMMARY OF THE INVENTION

The present invention entails a circuit box having two mounting elements to which, for example, an electrical control device and a fuse block can be mounted respectively. The two elements are spaced in horizontally spaced, vertically aligned relationship when panel mounted such that the electrical control device or fuse block on one mounting element will not contact the other mounting element. Hinge means pivotally connects one mounting element to the other such that one mounting element pivots between an open and closed position. In the closed position, the mounting elements are in a stacked relationship with one of the electrical components exposed, while in the open position, the other electrical element is accessible.

In the preferred embodiment of the invention, conduit means is defined by the pivotal mounting element to allow a connecting wire to couple the electrical control device and fuse block regardless of the position of the pivoted mounting element. Stop means can be provided between the pivotal and fixed mounting elements to limit the movement of the pivotal element when moved to an opening position.

Due to the stacked relationship of the mounting elements of the present invention, only half of the normal panel area is required to mount an electrical control device and fuse block thereto. The circuit box can easily be opened to check or replace a fuse therein, and does not require that the electrical control device be disconnected to do so. The circuit box also prevents the wire connecting the fuse block and electrical control device from contacting those elements when being opened and shut. The circuit box design also permits ease of manufacturing.

These and other objects features and advantages of the present invention will become apparent upon reading the following description thereof with reference to the accompanying drawings in which:

BRIEF DESCRIPTION OF THE DRAWINGS

FIG. 1 is a perspective view, partly in phantom form, of a circuit box embodying the present invention;

FIG. 2 is a fragmentary side view, partly broken away, of the hinge area of the circuit box of FIG. 1 with the cover shown in phantom form in the open position;

FIG. 3 is a fragmentary, right end view of the circuit box shown in FIG. 1;

FIG. 4 is a side cross-sectional view of the circuit box, motor control and fuse block assembly shown in FIG. 1 and further showing the electrical connection of the elements;

FIG. 5 is a fragmentary enlarged sectional view of one of the fasteners for the circuit box embodying the present invention; and FIG. 6 is a fragmentary, cross-sectional view taken along line VI—VI of FIG. 4 with snap fasteners and connecting wire shown in phantom.

DETAILED DESCRIPTION OF THE PREFERRED EMBODIMENT

In the preferred embodiment, circuit box 1 provides a mount for an electrical control device 2 such as motor starters or contactors and a fuse block 3 for the electrical control device 2, as shown in FIG. 1. Box 1 mounts motor control 2 and fuse block 3 in a stacked position so that although both elements are readily accessible only half of the normally required panel space is used to mount these two devices.

Fuse box 1 includes a fuse compartment 10 or housing which is defined by a fixed, first mounting element or mounting plate 12 and sides 14 which integrally extend from opposite edges of plate 12 to form a generally U-shaped, rectangular compartment with open ends. Floor 12 provides a circuit element mounting area to which fuse block 3 is mounted. Flanges 16 extend inwardly from the free ends of sides 14, as shown in FIGS. 1, 3 and 6. Flanges 16 are employed to add structural rigidity to the circuit box as well as provide a mounting area for releasable fasteners at one end and a hinge plate at the other end of the box as described below. Since compartment 10 has open ends, the open ends can serve as a conduit means through which a wire connecting the two electrical devices can pass.

A second pivotal mounting element 20 is a motor control mounting plate that forms a cover for fuse compartment 10 having a circuit element mounting area that is used to mount motor control 2. Motor control mounting plate 20 is a flat plate having side flanges 22 extending downwardly therefrom along opposite edges (FIGS. 3 and 6). Connected to side flanges 22 is a spaced barrier plate 32, which is parallel to and spaced slightly from mounting plate 20 to define a rectangular conduit 30 therebetween and of sufficient size to allow electrical wires to pass therebetween. Barrier plate 32 also has side flanges 34 extending therefrom and barrier plate 32 has sufficient width to snugly fit between side flanges 22 on motor control mounting plate 20. Side flanges 34 of barrier plate 32 are welded to side flanges 22 of mounting plate 20, as shown in FIGS. 3 and 6. There are no flanges on the ends of either mounting plate or barrier plate 32 so that conduit 30 has rectangular apertures 36 and 38 on either end (FIG. 4).

Barrier plate 32 has one plate of a hinge 40 welded at one end so that hinge 40 is adjacent opening 38 at the bottom end of conduit 30. Hinge 40 has a bottom hinge plate 42 which is welded between flanges 16 of fuse compartment 10, as shown in FIGS. 3 and 4, thereby pivotally connecting barrier plate 32 and mounting plate 20 to the fuse compartment portion of the circuit box.

As shown in FIG. 2, hinge 40 connects barrier plate 32 to flanges 16 a short distance from bottom edges 18 of sides 14, so as to couple hinge 40 and barrier plate 32 to sides 14. Therefore, as shown in FIGS. 1, 2 and 4, mounting plate 20 extends past the end of barrier plate 32 and covers hinge 40. Since mounting plate 20 extends past barrier plate 32, as mounting plate 20 is pivoted in the direction of arrow A, shown in FIG. 2, bottom edge 24 will rotate around hinge 40 and eventually engage with bottom edges 18 of sides 14. Bottom edges 18 of sides 14, therefore, provide a stop for contact surface 24 on mounting plate 20 and will hold mounting plate 20 in an open position, as shown in phantom in FIG. 2, that is roughly about 90° rotated from the closed position. When circuit box 1 is mounted on a wall with plate 12 extending vertically, gravity will hold the cover, defined in part by the mounting plate 20, in an open position for access to the fuse block 3.

As shown in FIGS. 1, 5 and 6, suitable fasteners 50 releasably hold the cover in a closed position. In the closed position, barrier plate 32 abuts flanges 16. As shown in FIG. 5, barrier plate 32 is slightly removed from the tightly closed, abutted position. When in a closed position one fastener 50 passes through the upper portion of each flange 16 and through plates 20 and 32. Although any suitable, releasable fastener can be used, FIG. 5 shows an exemplary fastener 50 including a flexible U-shaped clip 53 overlying an end of flange 16 and aligned with an aperture formed through the flange. Shoulders 52 on fasteners 50 pass through clip 53, fastener 50 is rotated until shoulders 52 engage and releasably seat on ramped sections 54 of clip 53. To open the circuit box 1, the two fasteners 50 are twisted in an opposite direction to disengage shoulders 52 from clip 53.

Fuse block 3 is mounted to plate 12 in fuse compartment 10 by conventional mounting hardware so that its top end 4 extends slightly beyond the open end of fuse compartment 10, as shown in FIGS. 1 and 4. The motor controller 2 is centered on mounting plate 20 and is secured thereto by bolts or screws whose length is selected to be sufficiently short so as not to engage barrier plate 32. The terminals of controller 2 is electrically coupled to the terminals of fuse block 3 by electrical conductors, as shown in FIG. 4.

A first wire 60 extends from the bottom of fuse block 3, passes around hinge 40 and is received into bottom opening 38 of conduit 30. Wire 60 extends through conduit 30, out through conduit opening 36 and is connected to the top of motor control 2. Thus, wire 60 has an overall "S" configuration when circuit box 1 is in the closed position. The wire 60 may include several conductors, as seen in FIG. 6, and typically, is located on one side of conduit 30, FIG. 6, so as to avoid contact with any screws or bolts used to mount motor control 2. Wire 60 and conductor 62a can be located between side flange 22 and the barrel of fastener 50 to prevent wire section 62a from sliding over and contacting a motor control mounting bolt, and/or one or more conductors represented by wire section 62b can be located between fasteners 50 but tied to one fastener 50 with a wire tie. Also, if desired, a bolt or fastener 58 can be inserted into the lower portion of conduit 30 in order to provide an additional location for securing wire section 62b by a wire tie. Suitable flexible conductors 65 (FIG. 4) couple controller 2 to a wireway 72, while incoming operating electrical power is coupled to fuse block 3 by conductors 66 exiting from a wireway or wiring trough 70.

Since mounting plate 20 extends past hinge 40, and a gap is left between hinge 40 and bottom edges 18 of sides 14, even if a bottom wall is placed on circuit box 1, a communicative gap will be left between conduit 30 and fuse chamber 10, through which wire 60 can be threaded.

OPERATION

Fuse box 1 is mounted to a panel between two parallel wireways 70, 72, shown in FIGS. 1 and 4. Fuse block 3 is bolted to mounting plate 12 by suitable bolts or other mounting apparatus, and motor control 2 is mounted on mounting plate 12 by suitable screws or bolts taking care that the mounting bolts do not pass through barrier plate 32. A wire lead 66 runs from one wireway 70 into the top of fuse block 3 and wire 60 is positioned as described above. Another wire 65 connects the bottom of motor control 2 to the other wireway 72, as shown in FIG. 4.

While in the closed position, motor control 2 is accessible, but since circuit box 1 holds motor control 2 and fuse block 3 in a stacked position, fuse block 3 is inaccessible. To gain access to fuse block 3, for inspection or maintenance, fasteners 50 are twisted open and the cover including mounting plate 20 pivoted downwardly to its stopped position where its bottom edge 24 contacts sides 14. Since wire 60 is strung through conduit 30 in the above described S-shaped configuration, mounting plate 20 can be pivoted without straining or disconnecting any wires. Although fuse box 1 does not require that wiring be removed, this is not to be confused with electrical disconnecting means or a disconnect switch. The meaning intended is that the device allows fuse checking or removal without removing wiring and does not eliminate the generally accepted safety practice of removing power when performing service. Conduit 30 prevents wire 60 from contacting either motor control 2 or fuse block 3 while mounting plate 20 is being pivoted. The box can be formed of suitable heavy gauge metal or molded of a suitable polymeric material with sufficient structural rigidity to carry the mechanical loads encountered. If a polymeric material is used, the fuse block 3 and plate 12, with sides 14 and flanges 16, FIG. 3, could become an integrated piece thus reducing the number of parts required. Fuse block 3 would then, itself, contain a mounting means as a portion thereof.

Fuse block top end 4 entends from circuit box 1 to allow the fuse continuity to be metered without opening circuit box 1. This is done by placing one meter probe on the incoming terminal of fuse block 3, and the other on the incoming terminal of the controller.

It is to be understood that the above is only a description of the preferred embodiment of the invention and that various modifications and improvements can be made without departing from the spirit of the invention contained therein. The scope of the invention is to be determined by the claims which follow and the breadth of interpretation which the law and doctrine of equivalents affords them.

The embodiments of the invention in which an exclusive property or privilege is claimed are defined as follows:

1. A circuit box comprising:

a first mounting element and a second mounting element for mounting a circuit element such as a fuse block on one of said mounting elements and an electrical control device on the other of said mounting elements, said first and second mounting elements positioned in spaced relationship to one another;

hinge means pivotally coupling said first and second mounting elements such that said second mounting element pivots between an open and closed position with respect to said first element, when in said closed position said elements are in a stacked relationship to each other with said second mounting element disposed between said first mounting element and the location of a circuit element mounted on said second mounting element and when in an open position said first mounting element is accessible; and conduit means for containing an electrical conductor for connecting circuit elements mounted on said first and second mounting elements, said conduit means being coupled to said second mounting element and moving therewith.

2. A circuit box comprising:

a first mounting element and a second mounting element for mounting a circuit element such as a fuse block on one of said mounting elements and an electrical control device on the other of said mounting elements, said first and second mounting elements positioned in spaced relationship to one another;

hinge means pivotally coupling said first and second mounting elements such that said second mounting element pivots between an open and closed position with respect to said first element and when in a closed position said elements are in a stacked relationship to each other and when in an open position said first mounting element is accessible;

conduit means for containing an electrical conductor for connecting circuit elements mounted on said first and second mounting elements, said conduit means being coupled to said second mounting element to move therewith;

said second mounting element including a mounting plate and a barrier plate coupled to and spaced from said mounting plate to define said conduit therebetween.

3. A circuit box comprising:

a first mounting element having a back wall defining a mounting area for a circuit element and two sides extending outwardly therefrom;

a second mounting element defining a cover pivotally coupled to said sides for movement between an open and a closed position, and including a mounting area for a circuit element, in said closed position, said first and second mounting elements being disposed in a stacked relationship in which said second mounting element obstructs access to said first mounting element, and said circuit box integrally including conduit means which permits the continuous electrical connection of circuit elements mounted to said mounting areas when said cover is moved between an open position in which said first mounting element is accessible and a closed position; and said second mounting element comprising a mounting plate and a barrier plate spaced from said mounting plate so as to define at least a portion of said conduit therebetween.

4. A circuit box as defined in claim 3, further comprising:

hinge means connected to said barrier plate and said sides, said mounting element, said sides and said barrier plate defining a partially enclosed fuse chamber when said cover is in the closed position with said conduit and said fuse chamber extending adjacent said hinge.

5. A circuit box as defined in claim 4, wherein:

one end of said mounting plate adjacent said hinge is disposed so as to contact said sides and stop said cover from opening past a predetermined open position of approximately 90° relative to said first mounting element.

6. A circuit box as defined in claim 4, wherein:

said conduit and said fuse chamber are communicative adjacent said hinge when said cover is in a closed position.

7. A circuit box, comprising:

a first mounting plate having sides extending upwardly therefrom;

a barrier plate pivotally connected to one end of said sides such that said first mounting plate, said sides and said barrier plate define an open ended fuse chamber; and a second mounting plate spaced from and coupled to said barrier plate so as to define a conduit therebetween, said conduit and said fuse chamber extending adjacent said hinge.

8. A circuit box as defined in claim 7, further comprising:

stop means for preventing said second mounting plate from pivoting past an open position of approximately 90° relative to said first mounting plate, said stop means including a contact surface on one edge of said second mounting plate adjacent said hinge.

9. A circuit box as defined in claim 7, further comprising:

a fuse block mounted on said first mounting plate;

an electronic control device mounted on said second mounting plate; and electrical conductor means connecting said fuse block and said electronic control device, said conductor means extending from said fuse compartment into said conduit adjacent said hinge.

* * * * *

UNITED STATES PATENT AND TRADEMARK OFFICE
CERTIFICATE OF CORRECTION

PATENT NO. : 4,530,032
DATED : July 16, 1985
INVENTOR(S) : John M. Perry, II

It is certified that error appears in the above-identified patent and that said Letters Patent is hereby corrected as shown below:

Column 6, line 15, claim 4:
  Before "mounting" insert --first--

Signed and Sealed this

Second Day of September 1986

[SEAL]

Attest:

Attesting Officer

DONALD J. QUIGG

Commissioner of Patents and Trademarks